UNITED STATES PATENT OFFICE.

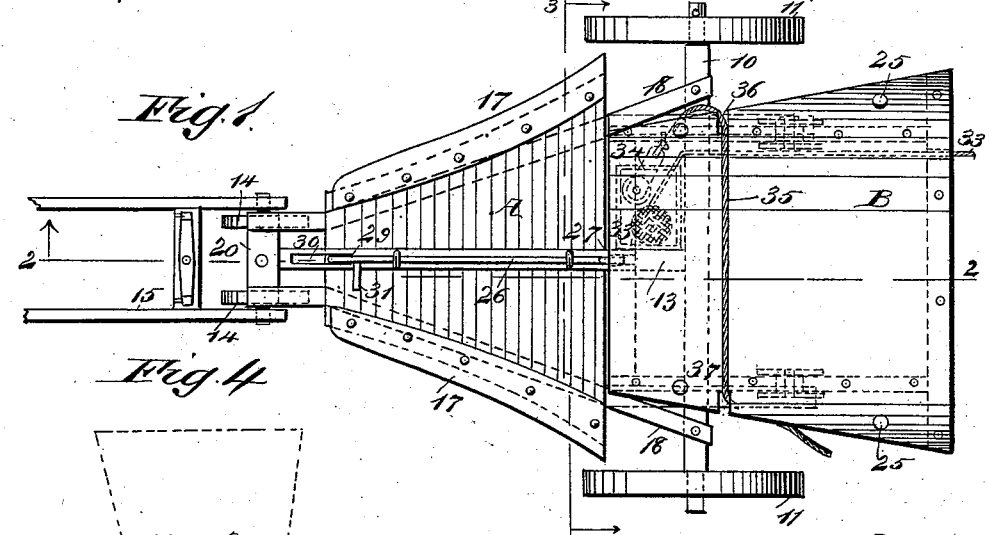

HENRY M. COX, OF PALMER, NEBRASKA, ASSIGNOR TO HIMSELF AND ANDREW M. TEMPLIN, OF SAME PLACE.

CORN-HARVESTER.

SPECIFICATION forming part of Letters Patent No. 531,512, dated December 25, 1894.

Application filed December 6, 1893. Serial No. 492,889. (No model.)

*To all whom it may concern:*

Be it known that I, HENRY M. COX, of Palmer, in the county of Merrick and State of Nebraska, have invented a new and Improved Corn-Harvester, of which the following is a full, clear, and exact description.

My invention relates to an improved corn harvester, and it has for its object to provide a harvester which when driven between two rows of corn will cut the corn from each row, and whereby further the cut stalks may be placed upon a shock platform and be bunched or held in bunched position while the platform is tilted to dump the shock upon the ground, and likewise to provide a means whereby the binding twine will be carried by the machine and be near at hand for use by the operator tying the shocks.

The invention consists in the novel construction and combination of the several parts, as will be hereinafter fully set forth and pointed out in the claim.

Reference is to be had to the accompanying drawings, forming a part of this specification, in which similar figures and letters of reference indicate corresponding parts in all the views.

Figure 1 is a plan view of the machine. Fig. 2 is a longitudinal vertical section taken practically on the line 2—2 of Fig. 1. Fig. 3 is a transverse vertical section taken practically on the line 3—3 of Fig. 1; and Fig. 4 is a view illustrating the manner in which the corn stalks are held in bundle or shock form prior to being permanently bound.

In carrying out the invention the frame of the machine consists of a rear axle 10, provided with the usual supporting wheels 11, a forward axle 12, much shorter than the rear axle, and a reach 13, securely attached to the central portion of the rear axle, and to the forward end of which reach the forward axle is pivotally secured. The forward axle is provided with a small supporting wheel 14 at each end, as shown in Figs. 1 and 2, and the thills 15, are attached to the said axle preferably at its ends, as shown in Fig. 1. The rear axle is provided at each side of the center with a bracket 16. The brackets are securely fastened to the axle, and extend rearward therefrom and downward in a forward direction, whereby each bracket is more or less angular in its formation. The vertical or forward portions of the bracket are adapted as the rear supports for a cutter platform A. This platform is wider at the back than at the front, is horizontally located, and is provided with blades 17 located at each side, the blades being adapted to extend from front to rear of the platform and to cut the rows of corn between which the machine is driven. The cutter platform is suspended at its rear end by arms 18, carried upward from the rear portion of the platform and secured to the forward face of the forward members of the brackets 16; and arms 19, are likewise projected upward from the forward end of the cutter platform, said arms being attached likewise to a head block 20, located at the forward end of the reach.

Standards 21, are projected upward from the outer extremities of the horizontal or rear members of the angle brackets 16, and upon these standards a shock or bundle platform B, is pivotally supported. This platform is made wider at its rear than at its forward end, and its upper face is concaved, as shown best in Fig. 3; and the pivotal connection between the frame and the shock platform is effected by forming ears or lugs 22 upon the under portion of the platform at its sides, and passing pivot pins 23 through said ears and through suitable apertures in the standards 21; and the said standards are likewise provided with apertures 24, located below their pivoted connection with the platform B. The platform is further provided with vertical posts 25, located along its side edges, the said posts being preferably removably introduced into the upper surface of the platform.

The shock platform B, is held in a horizontal position, or in position to receive the stalks of corn, through the medium of a latch, and the said latch is preferably made in the form of a shaft or spindle 26, held to slide upon the reach 13, as shown in Figs. 1 and 2, the shaft being provided at its rear end with a crank arm or head 27, one member of which is adapted to enter an opening 28, made in the front central portion of the shock platform, said opening serving as a keeper. A handle 29, is located at the opposite end of the shaft, preferably of angular construction, one of its members being made to enter a slot 30 located in the reach, whereby the shaft is prevented from rocking, and an arm 31, is projected from the handle in order that a person standing upon the cutter platform may strike the arm 31 with the foot and thus release the shock platform.

A box 32, or like receptacle, is preferably located beneath the shock platform, independent of the platform, since the box is usually secured to the rear axle and reach. This box is adapted to carry one or more balls of binding twine 33, and the said twine is carried rearward through the aperture 24 in the right-hand standard 21, and out through an opening in the back of the dumping shock platform, as shown in the drawings. In this manner the binding twine will always be conveniently at hand, as the shocks are bound when delivered at the rear of the machine.

The box 32, is likewise adapted as a receptacle for a pulley block 34, the said block having a rope 35 attached to it, which rope is carried at the right-hand side of the shock platform upward through a slot 36 made in that side, and is laid across the upper face of the shock platform and permitted to drop down in a slot 37, located in the left-hand side of the said platform and opposite the slot 36, as shown in Fig. 3.

In the operation of the machine, the shock platform having been locked in horizontal position, the rope 35, which may be termed the binding rope, is laid across the shock platform, and as the machine is driven between two rows of corn the corn stalks will be cut by the blades 17 and will drop upon the cutter platform A. Two assistants are generally stationed on this platform, one at each side of the reach, and they take up the cut stalks and place them upon the shock platform B with the cut ends of the stalks about flush with the rear end of this latter platform. When a sufficient quantity of corn stalks has been placed upon the shock platform to form a shock of desired size, the machine is stopped and one of the attendants will pass an end of the tie rope through the pulley block 34, and thus temporarily tie or bind the shock. The other attendant will then manipulate the latch and release the shock platform, which will dump, and the shock will be spilled upon the ground, the cut end of the corn downward, and since the shock is but loosely bound, the operator still holding the free end of the tie rope, as shown in Fig. 4, the corn stalks will accommodate themselves to any irregularities of the surface upon which they have been deposited. The shock is next permanently bound by the tie cord 33, which will be within easy reach at the end of the platform, and after this operation is effected the binding rope 35 is removed from the shock and the operation of cutting is again carried forward.

I am aware that a triangularly shaped cutting platform with blades cutting at each side is not new, and therefore I do not claim the same as my invention.

The shock platform is in practice pivoted quite a distance back of the rear axle and as the corn accumulates on said platform the front wheels will be proportionally relieved of weight, said weight being transferred to the rear wheels.

Having thus described my invention, I claim as new and desire to secure by Letters Patent—

A corn harvester, consisting of a frame comprising front and rear axles connected together by a reach and upon which wheels are mounted, the front axle being shorter than the rear axle, angular brackets secured to the rear axle and projecting rearwardly and forwardly and downwardly, a triangular cutter platform suspended between the wheels by arms secured to the forwardly projecting portion of the said brackets and to a head block of the reach, said platform being provided with a blade at each side, a concave shock or bundle platform pivoted to the rearwardly projecting portion of the said brackets, and a locking device for holding the said platform in a horizontal position, substantially as described.

HENRY M. COX.

Witnesses:
C. L. TIDD,
CHAS. S. MINNICH.